United States Patent
Bean et al.

(10) Patent No.: US 7,379,106 B2
(45) Date of Patent: May 27, 2008

(54) METHODS AND APPARATUS FOR READING A CCD ARCHITECTURE IN A SAMPLING MODE AND A NON-SAMPLING MODE

(75) Inventors: Heather Noel Bean, Fort Collins, CO (US); Mark Nelson Robins, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 10/648,391

(22) Filed: Aug. 27, 2003

(65) Prior Publication Data

US 2005/0046720 A1    Mar. 3, 2005

(51) Int. Cl.
*H04N 3/14* (2006.01)
*H04N 3/335* (2006.01)

(52) U.S. Cl. .................. 348/294; 348/311

(58) Field of Classification Search .............. 348/314, 348/294, 298, 299, 311, 315, 241, 248, 250, 348/208.1, 312, 316, 318; 257/431
See application file for complete search history.

(56) References Cited

U.S. PATENT DOCUMENTS

| | | | | |
|---|---|---|---|---|
| 5,668,597 | A * | 9/1997 | Parulski et al. | 348/350 |
| 6,549,644 | B1 * | 4/2003 | Yamamoto | 382/118 |
| 6,631,208 | B1 * | 10/2003 | Kinjo et al. | 382/167 |
| 6,697,537 | B2 * | 2/2004 | Norimatsu | 382/275 |
| 6,930,716 | B2 * | 8/2005 | Yoshida | 348/322 |
| 2001/0050715 | A1 * | 12/2001 | Sanpei | 348/312 |
| 2002/0164085 | A1 * | 11/2002 | Norimatsu | 382/275 |

OTHER PUBLICATIONS

"Charge-Coupled Device (CCD) Image Sensors", Rev. No. 1, May 29, 2001 http://www.kodak.com/global/plugins/acrobat/en/digital/ccd/applicationNotes/chargeCoupledDevice.pdf, pp. 11 and 13.
Excerpt from "Introduction to CMOS Image Sensors", www.micro.magnet.fsu.edu/primer/digitalimaging/cmosimagesensors.html, Turchetta et al.
"Application Note, Solid State Image Sensors, Terminology", Dec. 8, 1994 http://www.kodak.com/global/plugins/acrobat/en/digital/ccd/applicationNotes/terminology.pdf, p. 28.
Excepts from "Anatomy of a Digital Camera: Image Sensors", Sally Wiener Grotta, Jun. 12, 2001, sections "NASA's APS" and "Sensor Packaging".
"Digital Imaging Using CMOS Sensors," Borg et al., Agilent Technologies, Co., Ltd., http://www.eetasia.com/ARTICLES/2001APR/2001APR02_MSD_TAC.PDF.
"Lacture Notes 3, Introduction to Image Sensors," EE392B, Handouts#5, Prof. A. El Gamal, slide No. 27, http://www.stanford.edu/class/ee392b/handouts/sensors.pdf.

* cited by examiner

*Primary Examiner*—David Ometz
*Assistant Examiner*—Usman Khan

(57) ABSTRACT

A pixel-differentiated CCD imager architecture may include: a plurality of photo-sensing pixels arranged in a matrix, each pixel being classified according to type from among a plurality of photo-sensing pixel types; and read circuitry controllable to respectively read one or more of a second type of pixel independently of reading a first type of pixel, the reading of one or more first type pixels representing a sampling of fewer than all of the plurality of pixels, the sampling being obtainable without having to read all of the plurality of pixels. A related method and digital camera may include features similar to elements of the pixel-differentiated CCD imager architecture.

12 Claims, 8 Drawing Sheets

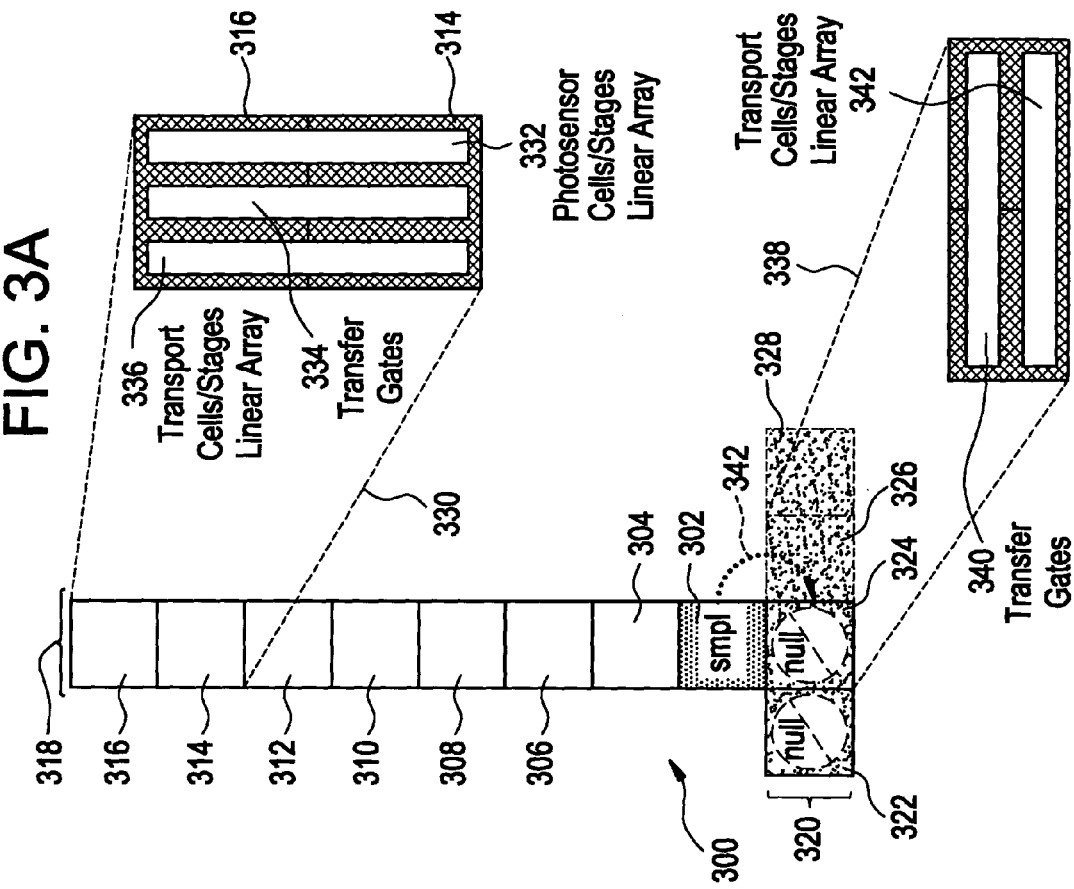
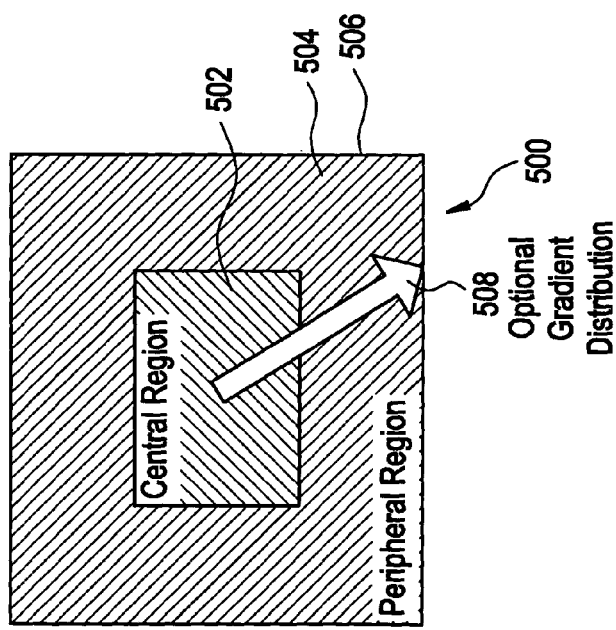

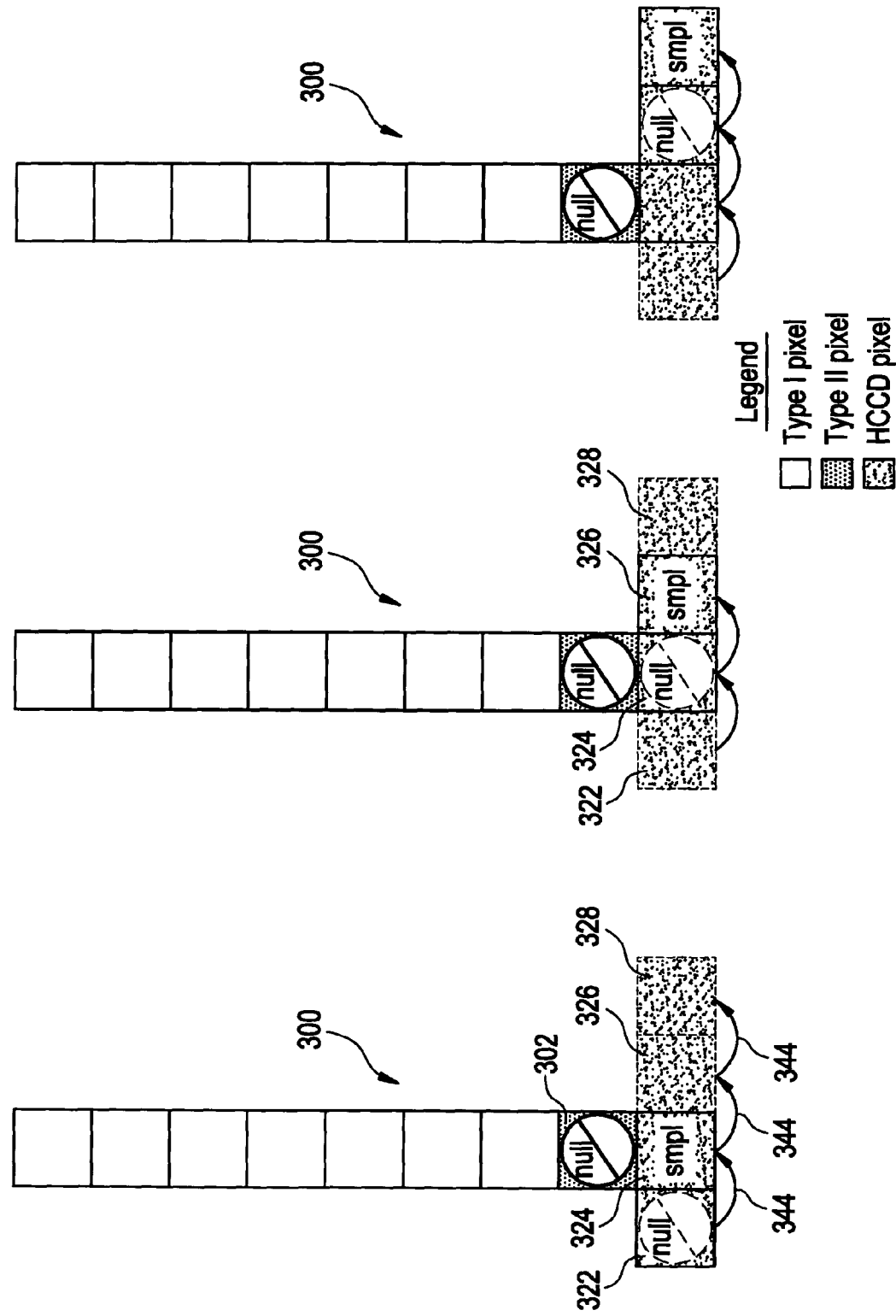

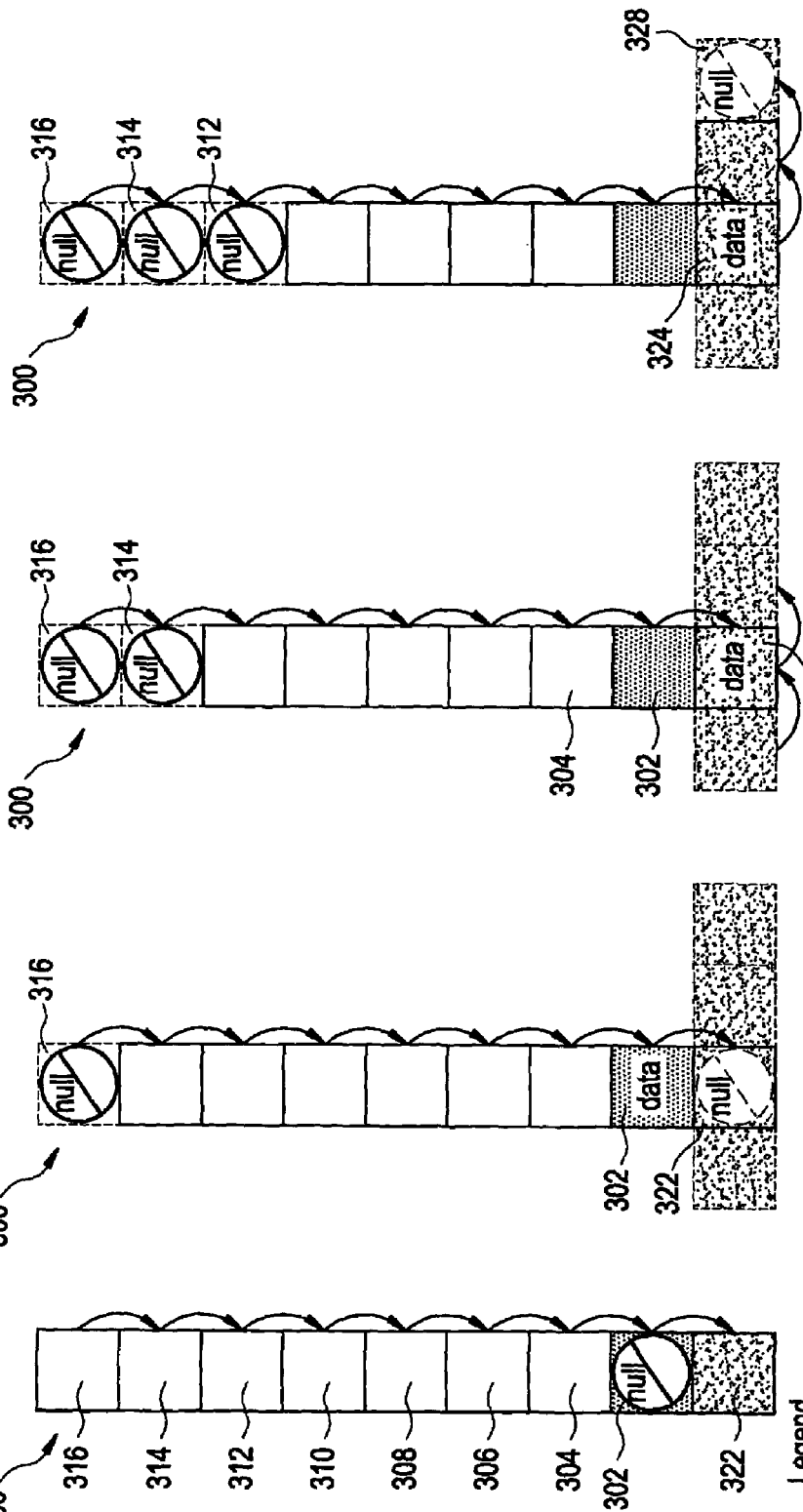

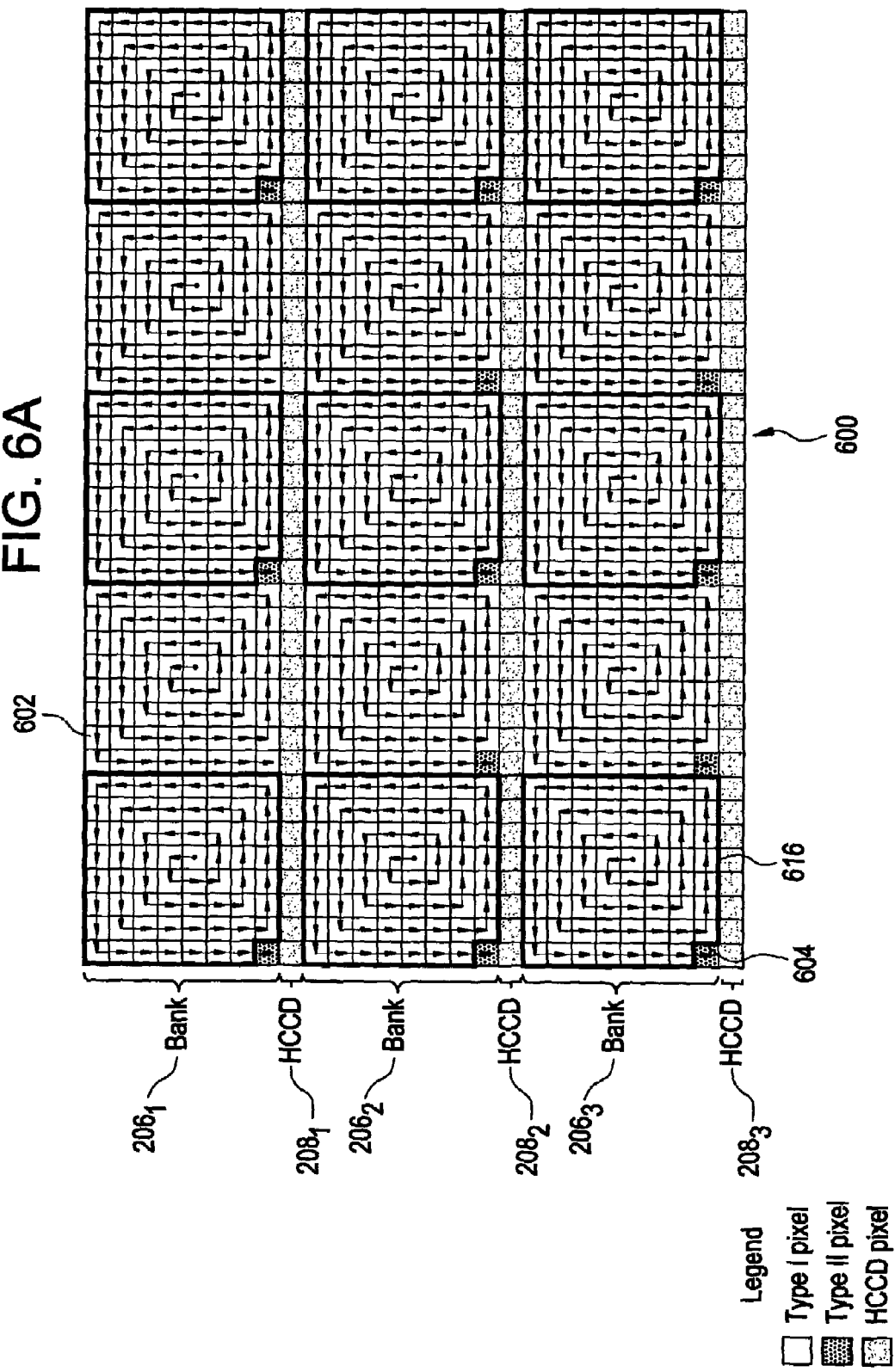

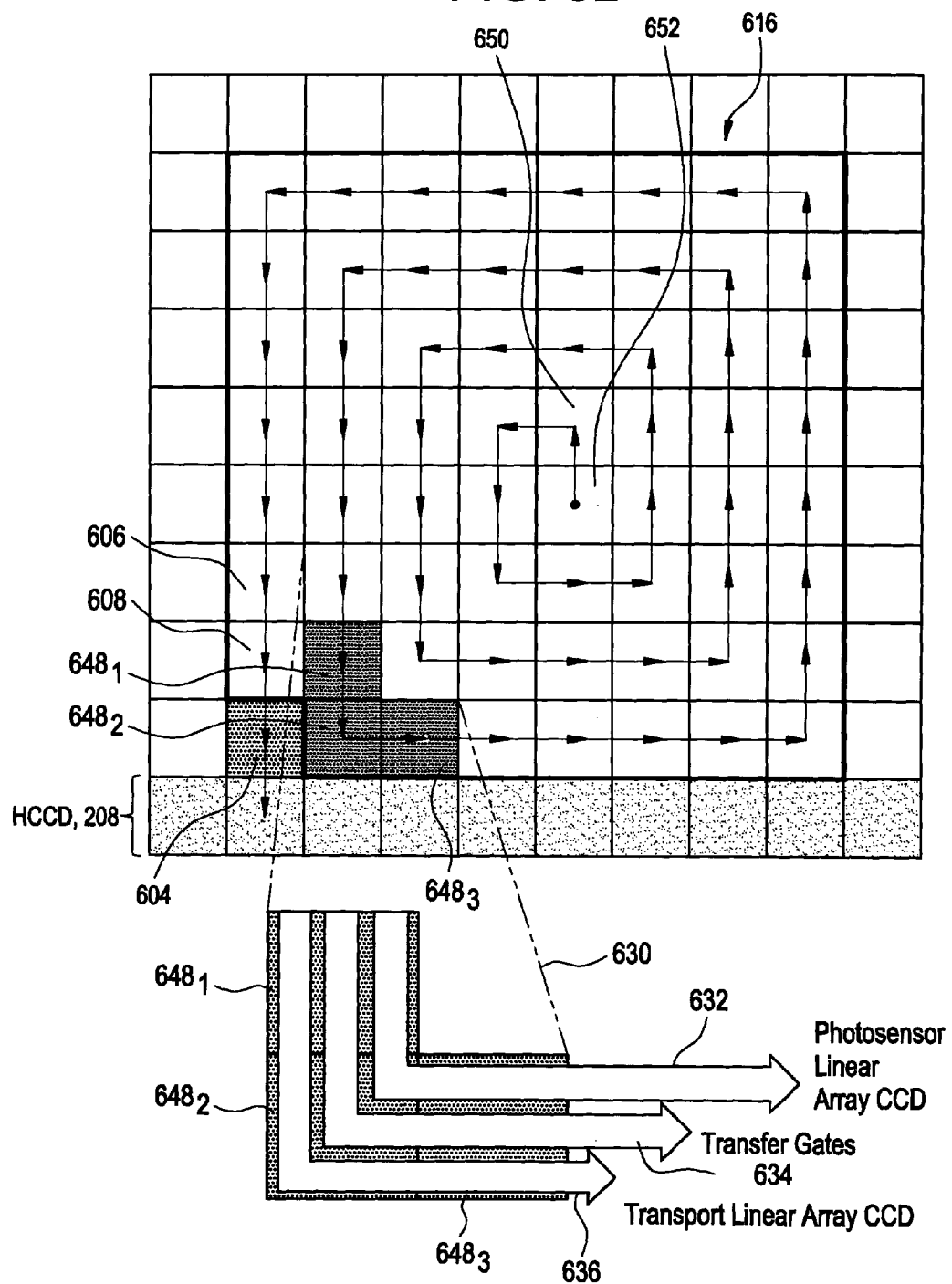

METHODS AND APPARATUS FOR READING A CCD ARCHITECTURE IN A SAMPLING MODE AND A NON-SAMPLING MODE

BACKGROUND OF THE INVENTION

An image sensor is a fundamental component that measures or captures a spatial, frequency and/or intensity distribution of the light to which it is exposed. An example of a system using such a sensor is a digital camera system (irrespective of whether the system captures still or moving images).

The image sensor generally does the following. Impinging light is converted to stored charge (electrons) that are transferred off the pixel area of the image sensor and then converted into voltages (analog signals). The analog signals are then converted into digital values that represent an image to which the image-sensor was exposed.

The charge-coupled device (CCD) remains the most popular technology for implementing an image sensor. A competing technology is the CMOS image sensor. An advantage of a CMOS sensor over the CCD sensor is that pixels on a CMOS sensor are individually addressable such that one or a few of the pixels can be read without having to read all of the pixels. In contrast, CCD imagers according to the Background Art have no provision for individually addressing one or more, but fewer than all, pixels.

SUMMARY OF THE INVENTION

One of the embodiments of the invention is directed to a pixel-differentiated CCD imager architecture. Such an architecture may include: a plurality of photo-sensing pixels arranged in a matrix, each pixel being classified according to type from among a plurality of photo-sensing pixel types; and read circuitry controllable to respectively read one or more of a second type of pixel independently of reading a first type of pixel, the reading of one or more first type pixels representing a sampling of fewer than all of the plurality of pixels, the sampling being obtainable without having to read all of the plurality of pixels.

Another one of the embodiments of the invention is directed to method of operating a CCD imager, the imager having a pixel-differentiated architecture that includes a first plurality of photo-sensing pixels arranged in a matrix, each pixel being classified according to type from among a plurality of photo-sensing pixel-types including a first type and a second type of photo-sensing pixel. Such a method may include: reading one or more of the second type pixels independently of reading the first type pixels, the reading of one or more second type pixels representing a sampling of fewer than all of the plurality of pixels, the sampling being obtainable without having to read all of the plurality of pixels.

Another one of the embodiments of the invention is directed to another pixel-differentiated CCD architecture. Such an architecture may include: a first plurality of non-sampling arrays that include a first type of photosensor; and a second plurality of sampling arrays that include the first type of photosensor and a second type of photosensor, each sampling array being arranged so that sample-information from the second type photosensor can be transferred out of the sampling array without the sample-information having to be conveyed via any of the first type photosensors in the sampling array; and transfer means for transferring information out of one or more selected second type photosensors without also having to transfer information contained in first type photosensors.

Still another of the embodiments of the invention is directed to another pixel-differentiated imager architecture. Such an architecture may include: a first plurality of blocks, each block having a second plurality of photo-sensing pixels arranged in a matrix, each pixel being classified according to type from among a plurality of types including a first type and a second type of photo-sensing pixel; and read circuitry controllable to respectively read one or more of the second type pixels independently of reading the first type pixels, the read-circuitry not being controllable to read all of the pixels individually. Another one of the embodiments of the invention is directed to a digital camera. Such a camera may include: a pixel-differentiated CCD imager architecture including a plurality of photo-sensing pixels arranged in a matrix, each pixel being classified according to type from among a plurality of photo-sensing pixel-types including a first type and a second type of photo-sensing pixel, and read circuitry controllable to respectively read one or more of the second type pixels independently of reading the first type pixels, the reading of one or more second type pixels representing a sampling of fewer than all of the plurality of pixels, the sampling being obtainable without having to read all of the plurality of pixels; and image processing means for controlling the read circuitry and processing the output of the pixel-differentiated CCD imager into a digital representation of an image captured by the pixel-differentiated CCD imager.

Another one of the embodiments of the invention is directed to another digital camera. Such a camera may include: a pixel-differentiated CCD imager including a first plurality of blocks, each block having a second plurality of photo-sensing pixels arranged in a matrix, each pixel being classified according to type from among a plurality of photo-sensing pixel-types including a first type and a second type of photo-sensing pixel; and read circuitry controllable to respectively read one or more of the second type pixels independently of reading the first type pixels, the read-circuitry not being controllable to read all of the pixels individually; and image processing means for controlling the read circuitry and processing the output of the pixel-differentiated CCD imager into a digital representation of an image captured by the pixel-differentiated CCD imager.

Additional features and advantages of the invention will be more fully apparent from the following detailed description of example embodiments and the accompanying drawings.

BRIEF DESCRIPTION OF THE DRAWINGS

The drawings are: intended to depict example embodiments of the invention and should not be interpreted to limit the scope thereof.

FIGS. 3A-3D and 4A-4D are more detailed depictions of a sampling array on the CCD imager of FIG. 2 and how the array operates in a sampling mode, according to an embodiment of the invention.

FIG. 5 is a block diagram of sampling:non-sampling array ratio distributions according to an embodiment of the invention.

FIG. 6A-6B are block diagrams of a portion of another pixel-differentiated CCD imager according to an embodiment of the invention.

DETAILED DESCRIPTION OF EXAMPLE EMBODIMENTS

An embodiment of the invention, at least in part, includes the recognition of the following. Selectively sampling and/or reading areas of an image sensor, e.g., for differentially shuttering areas of the imager, adaptively setting exposure time, performing rapid sequential reads of dynamic portions of an image without corresponding reads of static image areas (thereby reducing processing load), etc., would be desirable, especially if it also not necessary to read all areas of the image sensor. The individually-addressable pixels in a CMOS image sensor according to the Background Art would be well suited to selective sampling/reading. But not every pixel needs to be individually addressable for selective sampling/reading to be effective. Instead, it is sufficient to designate a subset of individually addressable pixels (selected pixel readability) and associate with each of these pixels a block of pixels that may be independently read within the array of pixels (block readability). The sampling (a.k.a. individually-addressable) pixels can be treated as representative of their associated blocks. While an imager in which all pixels are individually addressable is not practical with a CCD implementation, there can be practical implementations of CCD imagers having block readability and selected pixel readability. Alternatively, a CMOS imager having block readability and selected pixel readability (but not all of the pixels being individually addressable) would be easier/less costly to implement than a CMOS imager in which every pixel is individually addressable.

Figure 1:
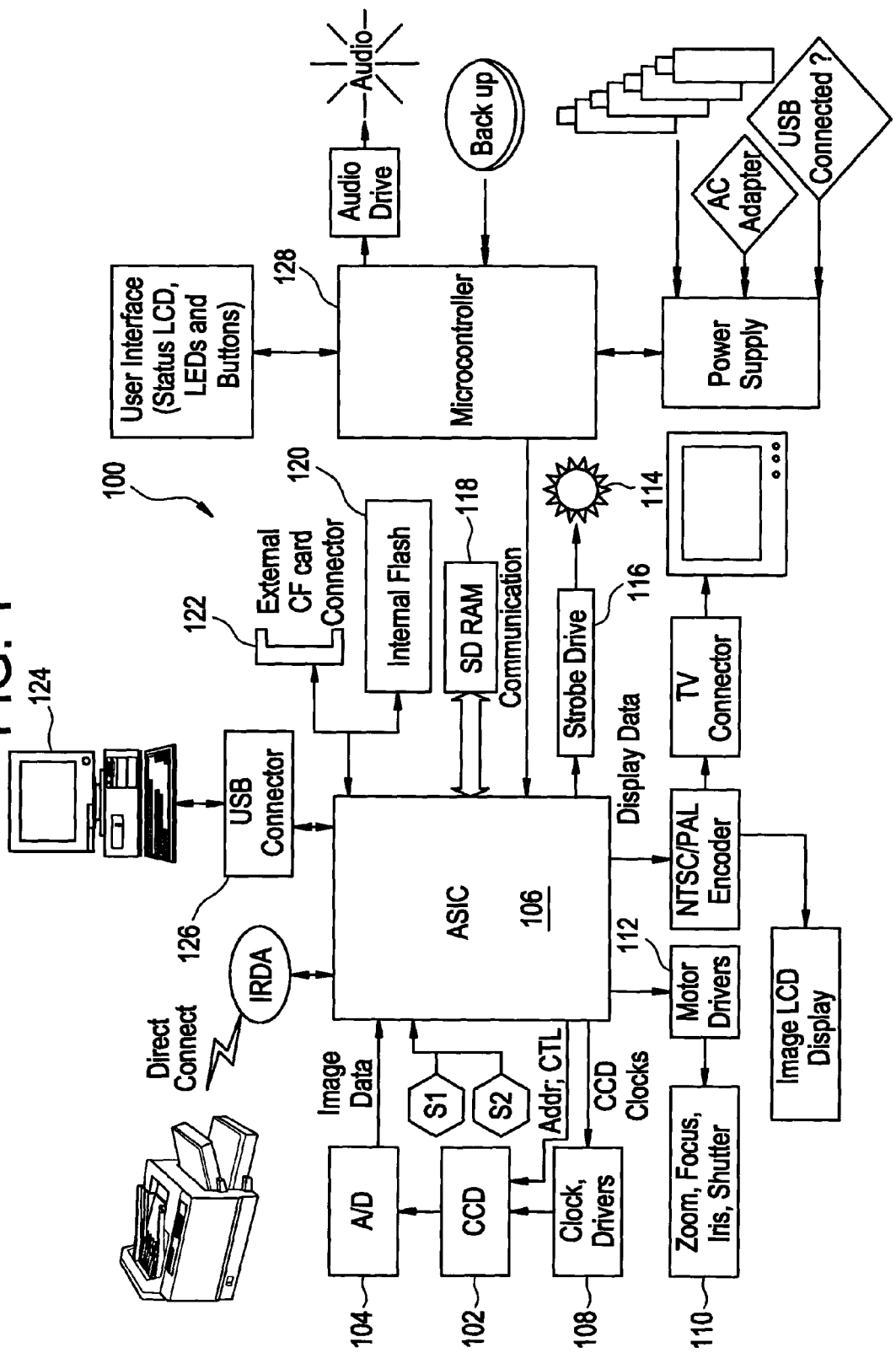
FIG. 1 is a block diagram of a digital camera architecture according to an embodiment of the invention.

FIG. 1 is a schematic block diagram of hardware architecture of a digital camera 100 according to an embodiment of the invention. The digital camera 100 of FIG. 1 includes an imager 102 having block readability and selected pixel readability (but not all of the pixels being individually addressable), according to an embodiment of the invention (to be discussed below). The imager 102 alternatively can be described as a pixel-differentiated imager.

The imager 102 can be a charge-coupled-device (CCD), or a CMOS device, each of which can output an analog signal.

The analog signal from the imager 102 can be provided to an analog-to-digital (A/D) device 104. Optionally, the A/D device 104 can be provided on the same integrated circuit as the imager 102. The A/D converter 104 provides a digitized version of the output of the imager 102 to an application-specific integrated circuit (ASIC) 106. The ASIC 106 provides clock signals to clock drivers 108 that are used to operate the imager 102.

The camera 100 also includes: zoom (optional), focus, iris and shutter mechanisms 110 that are operated via motor drivers 112 by the ASIC 106; and a flash unit 114 operated via a strobe drive 116 controlled by the ASIC 106. For memory devices, the digital camera 100 includes: a volatile memory 118, e.g., a synchronous dynamic random access memory (SDRAM) device; and a non-volatile memory 120, e.g., an internal flash memory device. Also, a connector 122 for connection to an external compact flash memory device is provided. The ASIC 106 can also connect to an external work station 124, e.g., through a universal serial bus (USB) connector 126. The digital camera 100 also includes a microcontroller 128 with which the ASIC 106 can communicate.

Other architectures for the camera 100 are contemplated. Each such architecture can include one or more processors, one or more volatile memory devices and one or more non-volatile memory devices.

Figure 2:
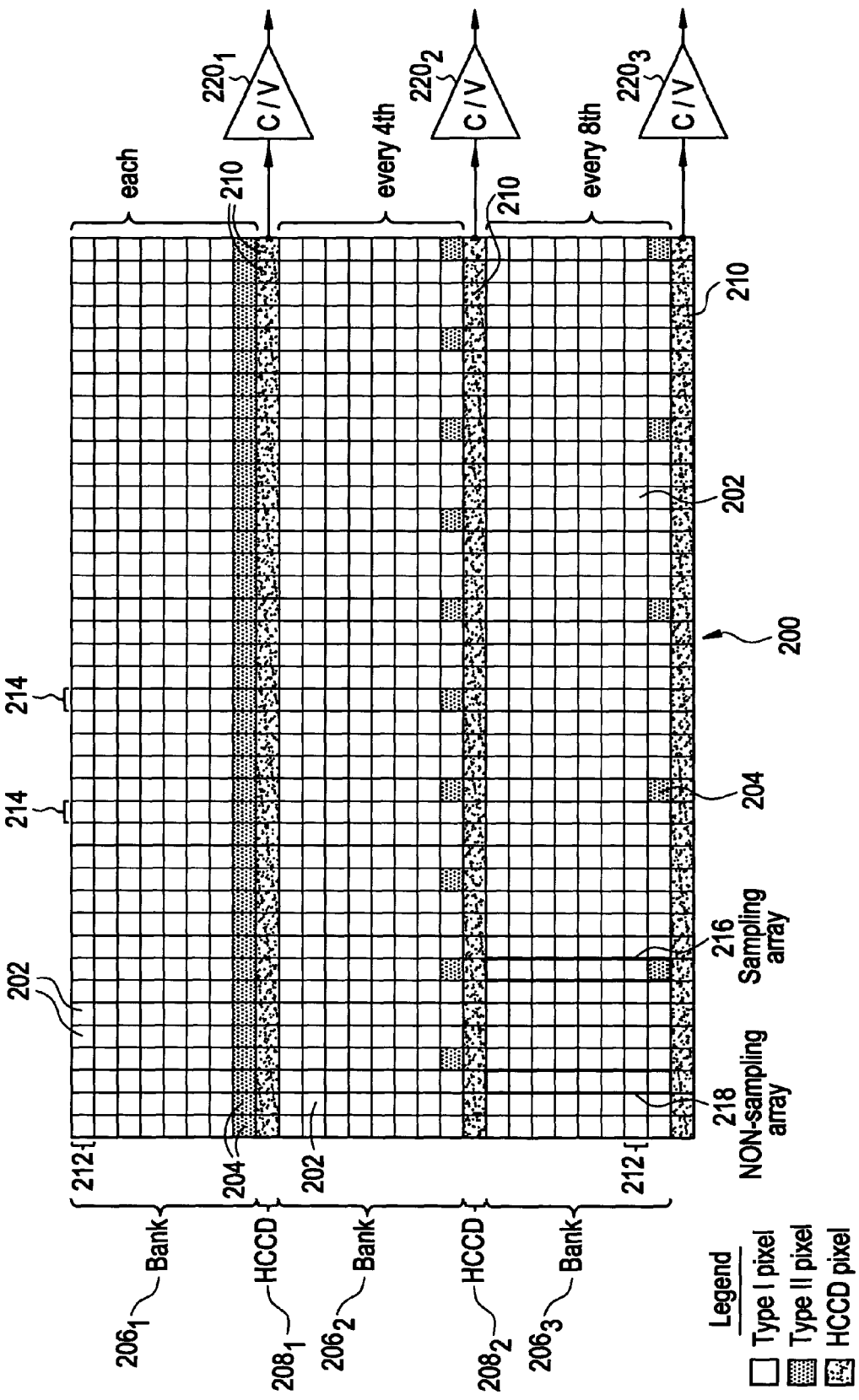
FIG. 2 is a block diagram of a portion of a pixel-differentiated CCD imager according to an embodiment of the invention.

FIG. 2 is a block diagram of a portion of a pixel-differentiated CCD imager 200 according to an embodiment of the invention. Only a portion of the pixel-differentiated imager 200 is shown in order to simplify the depiction. There are further simplifications in FIG. 2, as will be discussed below.

The imager 200 includes a first plurality of photo-sensing pixels, the majority of which can be classified as a first type of photo-sensing pixel 202 (hereafter also referred to as a Type I pixel). The first plurality further includes pixels that can be classified as a second type of photo-sensing pixel 204 (hereafter also referred to as Type II pixel). The Type I pixels 202 can be thought of as non-sampling pixels. In contrast, the Type II pixels can be thought of as sampling pixels. Physically, the Type I pixels 202 and the Type II pixels 204 are the same but for the addressing and control lines going to them, respectively, which give rise to their different classifications. More about the differences between Type I (non-sampling) and Type II (sampling) pixels will be discussed below. Alternatively, additional types of pixels can be provided on the image sensor 200.

The first plurality of photo-sensing pixels is organized into banks $206_1$, $206_2$ and $206_3$. Each bank $206_i$ can be described as having rows 212 and columns 214. Each bank $206_i$ has a linear array $208_i$ ($208_1$, $208_2$ and $208_3$, respectively) of information-transferring cells 210 adjacent one of its sides, e.g., here its lower side. In the CCD implementation, the array $208_i$ can be a horizontal linear CCD (HCCD); for simplicity, the array $208_i$ will be referred to as the HCCD $208_i$.

Charge that is produced in each of the pixels 202 and 204 is, e.g., in the CCD implementation, transferred by bucket-brigading vertically down each respective column 214 to the corresponding HCCD $208_i$ and moving transversely (e.g., here horizontally to the right) through HCCD $208_i$ to a corresponding known charge amplifier $220_i$ ($220_1$, $220_2$ and $220_3$, respectively).

Each bank $206_i$ is organized into arrays, each array being either a sampling array 216 or a non-sampling array 218. A sampling array 216 includes a Type II pixel 204 at the bottom, closest to the corresponding HCCD $208_i$. The other pixels in the array 216 are Type I pixels 202. The non-sampling array 218 includes Type I pixels 202 but does not include any Type II pixels 204.

An imager 200 can be formed entirely of sampling arrays 216 (i.e., without non-sampling arrays 218) or by a combination of sampling arrays 216 and non-sampling arrays 218. Where both are present, any number of ratios of sampling:non-sampling arrays can be used depending upon the circumstances for which the imager 200 is contemplated for use. The ratio of sampling:non-sampling arrays can be constant throughout the imager 200, or it can be non-uniform. For example, as depicted in FIG. 5, each of a central portion 502 and a peripheral region 504 of an imager 500 can have constant sampling:non-sampling ratios, with the ratio in the central region 502 being higher (relatively more sampling arrays 216) than in the peripheral region 504. As another alternative, the ratio of sampling:non-sampling arrays can be a gradient that decreases radially (i.e., the density of sampling arrays 216 decreases) from about the center of the imager 500 toward the periphery 506, as indicated by the arrow 508 depicted in phantom lines.

Returning to FIG. 2, it depicts the banks 206$_1$, 206$_2$ and 206$_3$ in the imager 200 as each being of a different constant ratio of sampling:non-sampling arrays. This can be an example of the decreasing gradient of sampling-array-218 density. One of ordinary skill would also understand that every bank 206$_i$ in the imager 200 can have the sampling: non-sampling ratio of the bank 206$_1$ (namely, only sampling arrays 216 and no non-sampling arrays 218), or the bank 206$_2$ (namely, three 1 sampling array 216 for every 3 non-sampling arrays 218, i.e., 25% sampling arrays 216) or the bank 206$_3$ (namely, three 1 sampling array 216 for every 7 non-sampling arrays 218, i.e., 12.5% sampling arrays 216) or some other ratio, e.g., a ratio in which there is a significantly greater number of Type I pixels 202 in a sampling array 216 relative to the single Type II pixel 204. Such a lower density type of imager 200 would be more difficult to depict in a drawing and so has not been depicted here. Again, the ratio of sampling:non-sampling arrays is not a limitation upon the invention.

Similarly, for simplicity, FIG. 2 depicts each of the sampling array 216 and the non-sampling array 218 as having a total of 8 pixels. This is a convenient number that permits three banks 206i to be depicted in a drawing, but any number of pixels can be selected for inclusion in an array 216/218. As before, the number of pixels in an array will depend upon the circumstances for which the imager 202 [S/B 200] is contemplated for use. The number of pixels in an array 216/218 is not a limitation upon the invention.

Lastly, the overall size of the imager 200 has similarly been simplified in FIG. 2. In practice, an imager 200 will have a great many more pixels comprising the first plurality, but that would make for a much more complicated drawing. In other words, the total number of photo-sensing pixels 202/204 in the imager 200 of FIG. 2 will depend upon the circumstances for which the imager 200 is contemplated for use.

FIG. 3A-3D are more detailed depictions of a sampling array 300 that corresponds to the sampling array 216 on the imager 200 of FIG. 2, as well as how the sampling array 300 operates in a sampling mode, according to an embodiment of the invention. In FIG. 3A, a Type II pixel 302 corresponds to the Type II pixel 204, Type I pixels 304-316 correspond to the Type I pixel 202, column 318 corresponds to the column 214, HCCD 320 corresponds to the HCCD 208$_i$ and the information-transferring cells 322-328 correspond to the information-transferring cells 210.

In the sampling mode, the array 300 is controllable so that only the information in the Type II pixel 302 is sampled/read. The information in the Type I pixels 304-316 is not read in the sampling mode. Depending upon the value of the sample read from the Type II pixel 302, the array 300 is controllable in a read-mode (more detail to be discussed below in terms of FIGS. 4A-4D) so that the information in the Type I pixels 304-316 is read. The term "controllable" is used here to connote that the imager 200, particularly the array 300, is configured with clocking lines and address/control lines so that the clocking circuit 108 and control logic, e.g., in the ASIC 106, respectively, can control the array 300 to behave according to the sampling-mode or the read-mode.

As shown by the exploded view 330 in FIG. 3A, the Type I pixels 304-316 (and also the Type II pixel 302) can be formed by a known configuration of a linear array of photo-sensing cells/stages 332, a linear array of transfer gates 334 and a linear array of transport cells/stages 336. As shown by the exploded view 330 in FIG. 3A, the HCCD 320 can be formed by a known configuration of a linear array of transfer gates 340 and a linear array of transport cells/stages 342.

In the sampling mode, the information in the Type II pixel 302 is sampled (as indicated by the legend "smpl" in the Type II pixel 302) and then (e.g., in the CCD implementation) bucket-brigaded to the corresponding charge-transferring cell 324 in the HCCD 320, as indicated by the arrow 342 depicted in phantom lines. No horizontal bucket-brigading in the HCCD 320 yet takes place. Before the transfer, a don't-care condition applies to the information in the charge-transferring cells 322-328, as indicated by the "null" legend in the cells 322 and 324. Again, the information in the Type I pixel 304 is not correspondingly bucket-brigaded into the Type II pixel 302 during the sampling mode.

In FIG. 3B, the sampled information previously in the Type II pixel 302 is shown in the charge-transferring cell 324. Because the information in the Type I pixel 304 does not get shifted into the Type II pixel 302 in the sampling-mode, a null is indicated in FIG. 3B for the Type II pixel 302. As no horizontal shifting in the HCCD 320 has yet occurred, a null remains indicated in the cell 322. Next, the HCCD is shifted one stage to the right as indicated by the arrows 344.

In FIG. 3C, the sampled information previously in the cell 324 is shown in the cell 326, and the null previously in the cell 322 is shown in the cell 324. As the information in the Type I pixels is not being read (shifted downwardly to the cell 322) in the sampling-mode, a null remains indicated for the Type II pixel 302. In FIG. 3D, the sampled information previously in the cell 326 is shown in the cell 328, the null previously in the cell 324 is shown in the cell 326 and a null remains indicated for the Type II pixel 302.

One of ordinary skill would appreciate that the shifting of the HCCD in FIGS. 3B-3D would continue until information from all of the sampled Type II pixels 302/204 serviced by the HCCD 320/208$_i$ is moved to the corresponding charge amplifier 220$_i$ and converted to a voltage. FIG. 4A-4D depict the sampling array 300 and how the array operates in a non-sampling mode, according to an embodiment of the invention. In the non-sampling mode, the information in the Type I pixels 304-316 is read. The decision to enter sampling mode can be based upon an evaluation of the sampled-information obtained from the Type II pixel 302 in the sampling mode. Details of how to determine when to enter the read-mode based upon the results of the sampling-mode can be found in a copending related application by the same inventors U.S. patent application Ser. No. 10/648445, filed Aug. 27, 2003 (now U.S. Pat. App. Publication No. 2005/0046723, published Mar. 3, 2005), and entitled "Adaptively Reading One Or More But Fewer Than All Pixels Of Image Sensor"), the entirety of which is hereby incorporated by reference.

In FIG. 4A, it is assumed that the sampling mode has taken place such that a null is present in the Type II pixel 302 (see the discussion of FIGS. 3A-3B above). The information accumulated in the Type I pixels 304-316 is (e.g., in the CCD implementation) bucket-brigaded to the corresponding charge-transferring cell 324 in the HCCD 320. In more detail, the information in the Type I pixels 304-316 is shifted 2 pixels downward resulting in FIG. 4C. FIG. 4B is intermediate to FIGS. 4A and 4C and represents the information in the Type I cells 304-316 having been shifted downward only by one pixel such that the null previously in the Type II pixel 302 is in the corresponding charge-transferring cell 322.

In FIG. 4C, the data previously in the Type I pixel 304 is in the charge-transferring cell 322. One of ordinary skill would appreciate that the HCCD 320/208$_i$ is horizontally shifted until the information from all of the Type I pixels 304 is moved out of the HCCD 320/208$_i$ to the corresponding charge amplifier 220$_i$ and converted to a voltage.

In FIG. 4B, a null is depicted at top of the sampling array 300 in the Type I pixel 316 to reflect the downward shift by one pixel. In FIG. 4C, a null is depicted in the Type I pixels 316 and 314 to reflect the downward shift by two pixels; similarly, a null is also depicted in the Type I pixel 312 at FIG. 4D to reflect the downward shift by three pixels. And, at FIG. 4D, the data from the Type I pixels 304 and 306 is in the charge-transferring cells 324 and 326, respectively.

Information obtained in the read-mode is missing a component corresponding to the Type II pixel 302 because it was previously read in the sampling-mode. In, e.g., the ASIC 106, the missing information can be interpolated from the neighboring information.

The non-sampling array 218 can be read in the read-mode comparably to how the sampling array 216 is read, as described in FIGS. 4A-4D. As the non-sensing array 218 does not have a Type II pixel 302, there is no missing component that needs to be interpolated.

FIG. 6A is a block diagram of a portion of another pixel-differentiated CCD imager 600 according to an embodiment of the invention. In some respects, the imager 600 is the same as the imager 200 and will adopt the same reference numbers for which little (or no) further explanation is given. In other respects, the imager 600 has features similar to the imager 200, the similar features being given similar reference numbers and additional explanation. Also, similar simplifications apply to FIG. 6A (and FIGS. 6B and 7) as for FIG. 2.

Instead of the combination of the linear sampling arrays 216 and the linear non-sampling arrays 218, the imager 600 is shown as having only the sampling arrays 616 in the banks 206i. Each of the arrays 616 includes Type I pixels 602 and a Type II pixel 604. For ease of recognition, a heavy line has been depicted around the Type I pixels 602 for every other array 616.

Despite having an appearance (upon first impression) of more than one column (i.e., which would otherwise connote a two-dimensional array), the sampling array 616 is a linear array of photo-sensing pixels 602/604, albeit a linear array arranged into a space-filling configuration. In FIG. 6, the space-filling configuration is a piecewise-continuous spiral. FIG. 6B is a more detailed depiction of the piecewise-continuous spiral arrangement of the sampling array 616 of FIG. 6A and how the array 616 operates, according to an embodiment of the invention.

In FIG. 6B, the end of the linear array corresponds to the Type I pixel 652, which is analogous to the top Type I pixel 316 in the sensing imager 316 and represents the Nth photo-sensing pixel (here, the 63$^{rd}$ pixel, where the Type II pixel 302 is the zeroith pixel). The type I pixel 650 represents the N-1 pixel, etc. Charge is bucket-brigaded in a spiral direction counterclockwise moving away from the Type I pixel 652. Similar to the imager 200, in the exploded view 630, the Type I pixels 604, 608, 648$_1$, 648$_2$, 648$_3$, 650 and 652 (and also the Type II pixel 602) can be formed by a known configuration of a linear array of photo-sensing cells/stages 632, a linear array of transfer gates 634 and a linear array of transport cells/stages 636.

In the spiral arrangement of FIGS. 6A-6B, the footprint of the photo-sensing elements of the array 332, the transfer gates 334 and the transport stages 336 can be in a shape other than the typical rectangle or square. Such a shape, e.g., a hexagon, would be better suited to tile a two-dimensional area.

Figure 7:
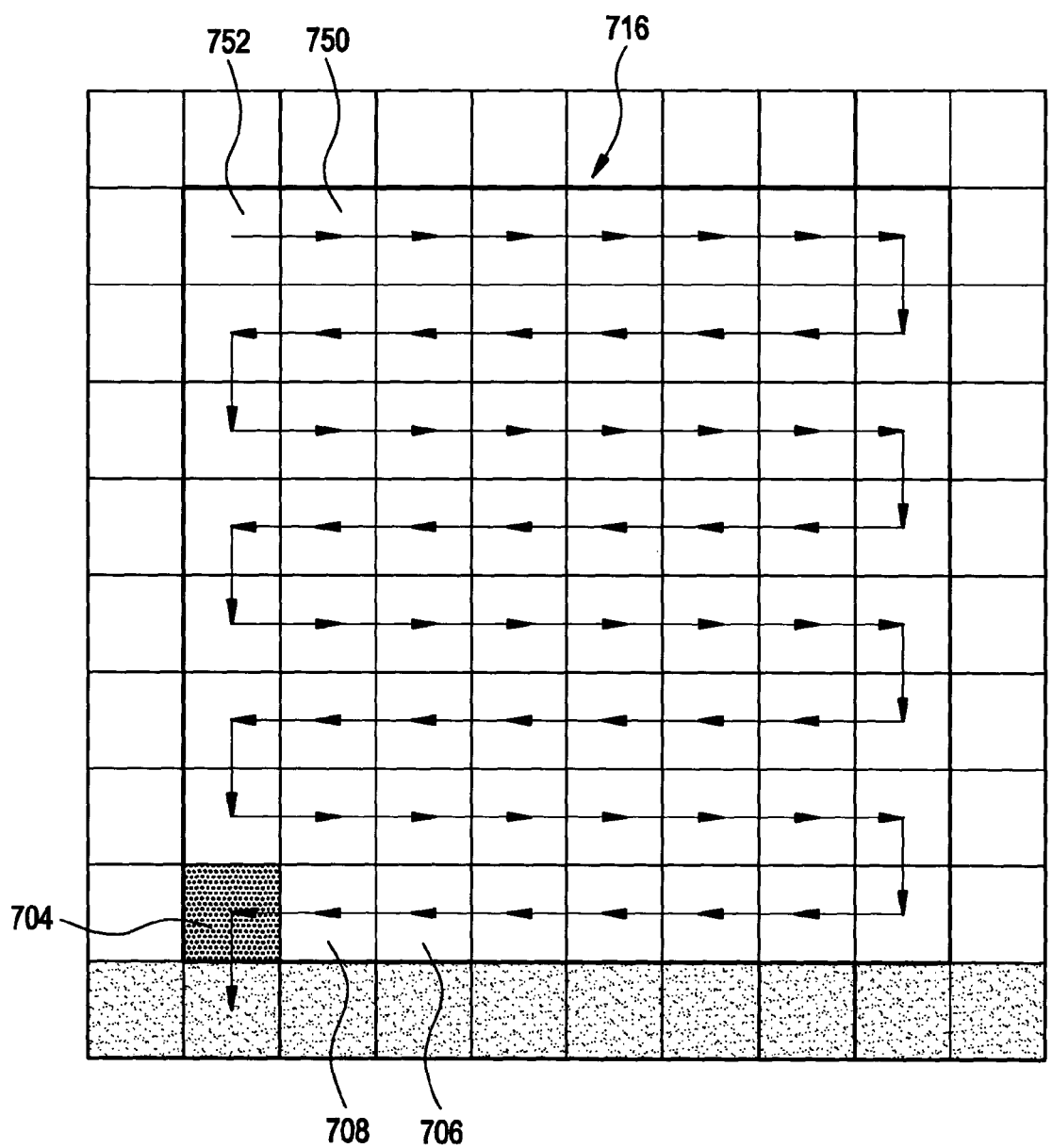
FIG. 7 is an alternative to FIGS. 6A-6B, FIG. 7 being a more detailed depiction of an alternative sampling array on the CCD imager of FIGS. 6A-6B and how the array operates, according to an embodiment of the invention.

FIG. 7 is an alternative to FIGS. 6A-6B, FIG. 7 being a more detailed depiction of an alternative sampling array on the CCD imager of FIGS. 6A-6B and how the array operates, according to an embodiment of the invention. Instead of the piecewise-continuous spiral arrangement of the sensing array 616, the sensing array 716 is a linear array arranged into a space-filling configuration taking the form of a raster. In FIG. 6, by contrast, the space-filling configuration is a piecewise-continuous spiral. Otherwise, FIG. 7 has corresponding item numbers 704, 706, 708, 750 and 752.

The invention being thus described, it will be obvious that the same may be varied in many ways. Such variations are not to be regarded as a departure from the spirit and scope of the invention, and all such modifications are intended to be included within the scope of the present invention.

We claim:

1. A CCD imager architecture comprising:
   a plurality of banks of photo-sensing pixels arranged in a matrix of rows and columns, the photo-sensing pixels configured to record data collectively representative of an image;
   a plurality of horizontal CCD (HCCD) arrays comprising information-transferring cells, each HCCD array being located adjacent a corresponding bank of photo-sensing pixels, and each information-transferring cell corresponding to a respective column of photo-sensing pixels;
   a controller and a clock, the controller configured to operate the clock to control transfer of the data from the photo-sensing pixels to the information-transferring cells, and from the information-transferring cells to a charge amplifier; and
   wherein the controller is configured to operate in a sampling mode and a non-sampling mode, and:
   when in the non-sampling mode, to sequentially transfer all of the data in the column of photo-sensing pixels into the corresponding information-transferring cell in the respective HCCD; and
   when in the sampling mode, to transfer data from only one of the photo-sensing pixels from selected ones of the columns of photo-sensing pixels into the corresponding information-transferring cell in the respective HCCD.

2. The CCD imager architecture of claim 1, and wherein, in the sampling mode, the controller is configured to transfer into the HCCD array, from the selected columns, only the data from the photo-sensing pixels that are adjacent to the HCCD array.

3. The CCD imager architecture of claim 1, and wherein:
   the selected columns in each bank are identifiable by a number of selected columns; and
   in the sampling mode, the number of selected columns decreases for each bank as a function of a distance from a selected point in the imager.

4. The CCD imager architecture of claim 1, and wherein the selected columns are not adjacent to one another.

5. A digital camera comprising a CCD imager architecture according to claim 1.

6. A CCD imager architecture comprising:
   a plurality of banks of photo-sensing pixels arranged in a matrix of rows and columns, the photo-sensing pixels configured to record data collectively representative of an image;
   a plurality of horizontal CCD (HCCD) arrays comprising information-transferring cells, each HCCD array being located adjacent a corresponding bank of photo-sensing pixels, and each information-transferring cell corresponding to a respective column of photo-sensing pixels;

a controller and a clock, the controller configured to operate the clock to control transfer of the data from the photo-sensing pixels to the information-transferring cells, and from the information-transferring cells to a charge amplifier; and wherein the controller is configured to operate in a sampling mode and a non-sampling mode, and:

when in the non-sampling mode, to sequentially transfer all of the data in the column of photo-sensing pixels into the corresponding information-transferring cell in the respective HCCD; and when in the sampling mode, to transfer data from less than all of the photo-sensing pixels from selected ones of the columns of photo-sensing pixels within a selected bank into the corresponding information-transferring cell in the respective HCCD, and wherein the selected ones of the columns of photo-sensing pixels in the selected bank comprise less than all of the columns in the bank.

7. A digital camera comprising a CCD imager architecture according to claim 6.

8. A method of operating a CCD imager architecture, the CCD imager architecture comprising a plurality of banks of photo-sensing pixels arranged in a matrix of rows and columns, the photo-sensing pixels configured to record data collectively representative of an image, the CCD imager architecture further comprising a plurality of horizontal CCD (HCCD) arrays comprising information-transferring cells, each HCCD array being located adjacent a corresponding bank of photo-sensing pixels, and each information-transferring cell corresponding to a respective column of photo-sensing pixels, the method comprising:

in a non-sampling mode, sequentially transferring all of the data in the column of photo-sensing pixels into the corresponding information-transferring cell in the respective HCCD array; and in a sampling mode, transferring data from only one of the photo-sensing pixels in selected columns of photo-sensing pixels into the corresponding information-transferring cell in the respective HCCD.

9. The method of claim 8, and wherein, in the sampling mode, only the data from the photo-sensing pixels, from the selected columns, that are adjacent to the HCCD array are transferred into the HCCD array.

10. The method of claim 8, and wherein:

the selected columns in each bank are identifiable by a number of selected columns; and in the sampling mode, the number of selected columns decreases for each bank as a function of a distance from a selected point in the imager.

11. The method of claim 8, and wherein the selected columns are not adjacent to one another.

12. A method of operating a CCD imager architecture, the CCD imager architecture comprising a plurality of banks of photo-sensing pixels arranged in a matrix of rows and columns, the photo-sensing pixels configured to record data collectively representative of an image, the CCD imager architecture further comprising a plurality of horizontal CCD (HCCD) arrays comprising information-transferring cells, each HCCD array being located adjacent a corresponding bank of photo-sensing pixels, and each information-transferring cell corresponding to a respective column of photo-sensing pixels, the method comprising:

in a non-sampling mode, sequentially transferring all of the data in the column of photo-sensing pixels into the corresponding information-transferring cell in the respective HCCD array; and in a sampling mode, transferring data from less than all of the photo-sensing pixels from selected ones of the columns of photo-sensing pixels within a selected bank into the corresponding information-transferring cell in the respective HCCD, and wherein the selected ones of the columns of photo-sensing pixels in the selected bank comprise less than all of the columns in the bank.

* * * * *